United States Patent [19]
Teng et al.

[11] Patent Number: 6,027,681
[45] Date of Patent: Feb. 22, 2000

[54] STACK MOLD LINKAGE WITH UNEQUAL STROKES

[75] Inventors: Alex Teng, Etobicoke; Robert Schad, Toronto, both of Canada

[73] Assignee: Husky Injection Molding Systems Ltd., Canada

[21] Appl. No.: 09/054,692

[22] Filed: Apr. 3, 1998

[51] Int. Cl.[7] .................................................. B29C 45/64
[52] U.S. Cl. .................... 264/297.2; 264/328.8; 425/338; 425/450.1; 425/451.2; 425/451.3; 425/451.5; 425/588; 425/589; 425/590; 425/592
[58] Field of Search ............................. 264/297.2, 328.8, 264/334; 425/190, 338, 450.1, 451.2, 451.3, 451.5, 588, 589, 590, 592

[56] References Cited

U.S. PATENT DOCUMENTS

| | | |
|---|---|---|
| 3,669,601 | 6/1972 | Lainesse . |
| 3,941,548 | 3/1976 | Bruder ................................. 425/450.1 |
| 4,207,051 | 6/1980 | Wright et al. ........................... 425/556 |
| 4,400,341 | 8/1983 | Sorensen ................................ 264/328.8 |
| 4,718,845 | 1/1988 | Sheffield et al. ........................ 425/589 |
| 4,753,592 | 6/1988 | Kaaden .................................. 425/588 |
| 4,929,166 | 5/1990 | DiSimone et al. ....................... 425/190 |
| 5,104,308 | 4/1992 | Morton et al. .......................... 425/589 |
| 5,458,843 | 10/1995 | Brown et al. ......................... 264/297.2 |
| 5,578,333 | 11/1996 | Schad et al. ............................ 425/588 |
| 5,707,666 | 1/1998 | DiSimone et al. ...................... 425/588 |

*Primary Examiner*—James P. Mackey
*Attorney, Agent, or Firm*—Bachman & LaPointe, P.C.

[57] ABSTRACT

The present invention relates to stack mold linkages for creating unequal strokes for use in an injection molding machine for making different sized molded parts. The stack mold linkages comprise linkages for moving each of at least two mold assemblies between a mold closed position and a mold open position and for separating the mold halves forming the mold assemblies by unequal stroke lengths.

44 Claims, 18 Drawing Sheets

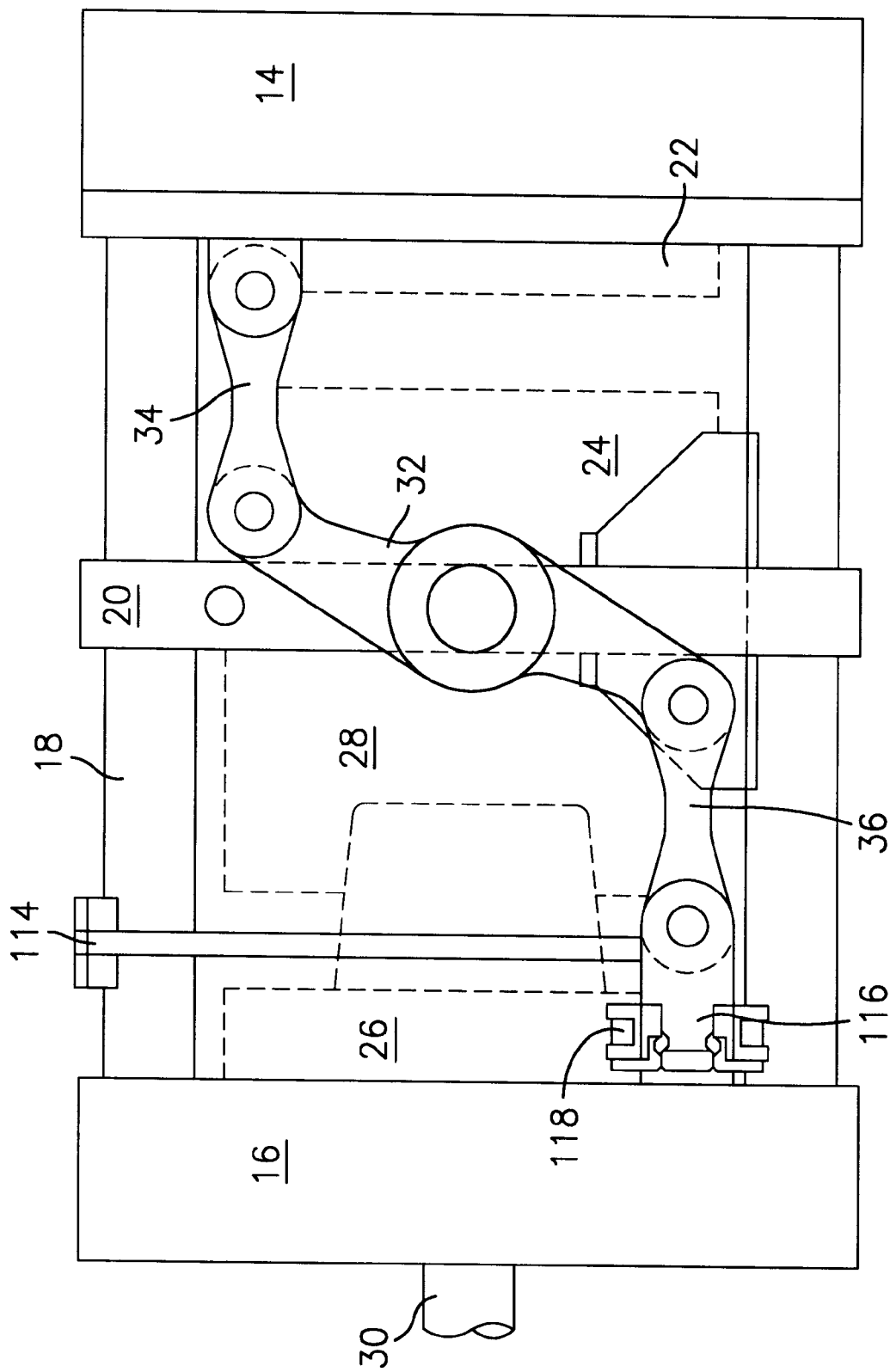

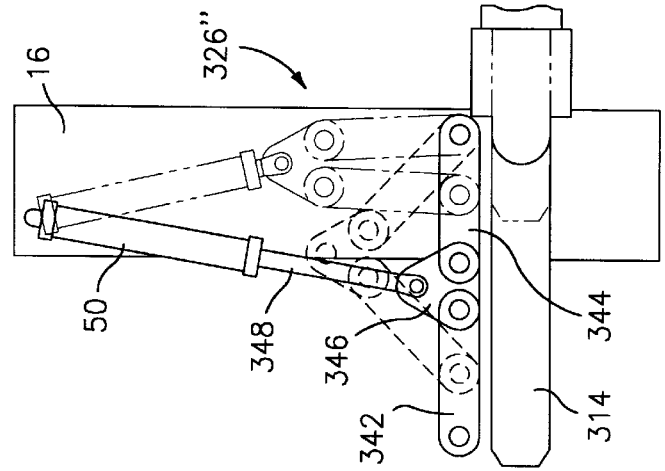
FIG. 4F
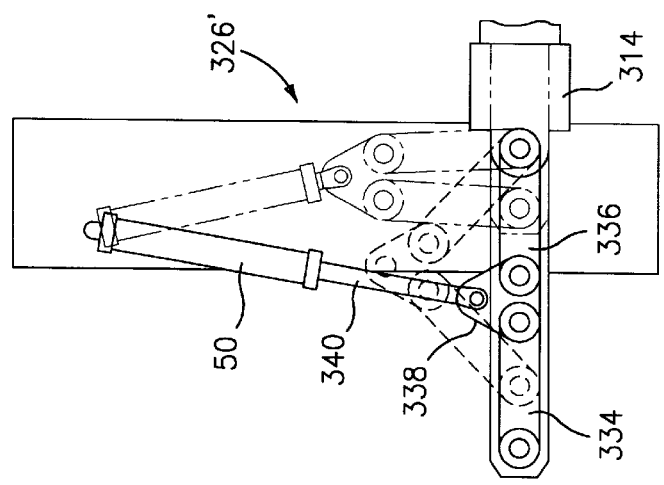
FIG. 4H
FIG. 4E
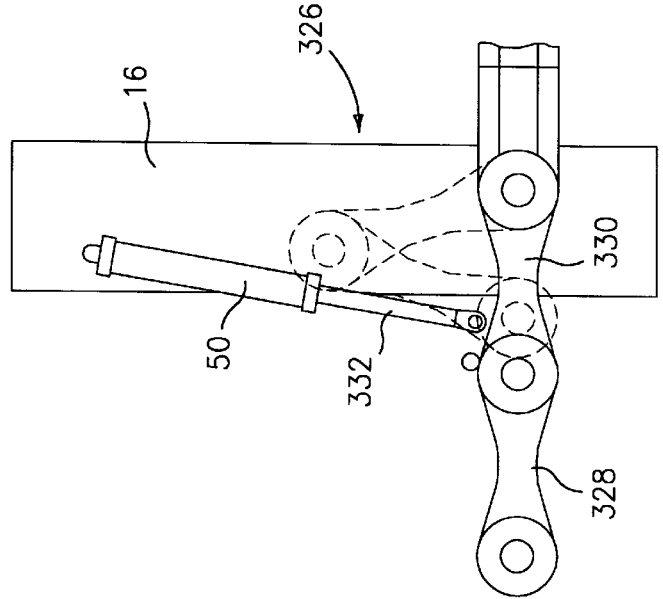
FIG. 4G
FIG. 4D

STACK MOLD LINKAGE WITH UNEQUAL STROKES

BACKGROUND OF THE INVENTION

The present invention relates to an injection molding machine for producing different parts that has a linkage for producing unequal strokes during the opening and closing of the mold sections. The present invention also relates to a method for fabricating molded articles of different sizes using a single molding machine.

A multi-level stack mold typically uses a linkage system to open and close the mold sections while maintaining equal spacing between all sections.

U.S. Pat. No. 3,669,601 to Lainesse shows an early two level stack mold which is opened by the motion of a platen. As the platen moves, a first mold station nearest the platen opens, while a second mold station remains closed. Pins, fastened to a center section, slide through a pair of plates until their heads contact the underside of one of the plates, thus limiting the opening stroke of the first mold station. As the platen continues to move, the center section is now caused to move via the pins. Other pins, fastened to the center section, slide through a second pair of plates until their heads contact the underside of an ejector plate causing it to move and compress springs which cause the second mold station to open. Motion of the platen continues until the heads, already bottomed out on the ejector plate, fully compress the springs thereby ejecting the parts from the second mold station. This mechanical system thereby causes a two level stack mold to open sequentially, first one side, then the other.

U.S. Pat. No. 3,941,548 to Bruder shows a two level stack mold which uses pairs of cylinders hydraulically connected to each other such that the opening motion of a movable platen causes an upper rod of an upper cylinder to move inside the cylinder and displace oil that is conducted via a pipe to a lower cylinder acting on its piston and causing a lower rod to extend and push against a fixed platen, thereby causing the center section of the stack mold to separate from the fixed platen. In this way, both mold stations are opened simultaneously by equal amounts at equal speeds.

U.S. Pat. No. 4,400,341 to Sorensen shows a two level stack mold in which a center section is opened independently of the moving platen by means of a cylinder. Each mold station is opened sequentially according to the stroke of the cylinder. One mold is opened while the others remains closed.

U.S. Pat. No. 4,207,051 to Wright shows a two level stack mold in which pairs of racks acting with a central pinion cause the mold stations to open simultaneously and equally in both stroke and speed.

U.S. Pat. No. 4,929,166 to DiSimone shows a two level stack mold carrier in which machine mounted castings for holding the center section of a stack mold are moved by means of pairs of racks and pinions having different diameters, and both mounted on the moving platen, such that the center section of the mold remains equally spaced between the fixed and moving platens of the machine.

U.S. Pat. No. 5,458,843 to Brown shows a four level stack mold linkage system in which all mold stations are opened equally in both stroke and speed via the opening motion of the moving platen.

U.S. Pat. Nos. 5,578,333 and 5,707,666, both to Schad, show multilevel stack mold carriers for four level stack molds in which nested castings mounted in the machine, support various sections of the stack mold and are moved by nested drive means such that the centermost section is driven first by the moving platen motion. Mounted to the center carrier are secondary drive means to cause the motions of the remaining mold sections such that all mold stations are open/closed equally both in speed and distance.

None of the above mentioned patents describe a linkage mechanism for opening and closing the various sections of a stack mold by unequal distances between the various mold sections. Nor are there any descriptions of linkage mechanisms for facilitating such unequal motions in an adjustable manner such that a stack mold carrier so equipped can be used to accommodate installations of different stack mold configurations requiring different unequal strokes.

SUMMARY OF THE INVENTION

Accordingly, it is an object of the present invention to provide a stack mold having a linkage mechanism for opening and closing the various sections of the mold by unequal strokes between the various mold sections.

It is a further object of the present invention to provide a stack mold as above having an adjustable linkage mechanism.

It is yet a further object of the present invention to provide a method for fabricating molded parts of different sizes using a single molding machine.

The foregoing objects are attained by the machine and the method of the present invention.

In accordance with the present invention, an injection molding machine has a stack mold including a stationary platen and at least two members movable relative to the stationary platen. At least two mold assemblies are formed by mold halves attached to the stationary platen and the at least two movable members. The machine further has means for moving each of the mold assemblies between a mold closed position and a mold open position, which moving means includes means for separating the mold halves forming the mold assemblies by unequal stroke distances. The separating means preferably comprises a first means for separating the mold halves of a first one of the mold assemblies by a first stroke distance and second means for separating the mold halves of a second one of the mold assemblies by a second stroke distance, which second means may be actuated when one of the movable members reaches a preselected position.

A method for fabricating molded articles of different sizes using a single molding machine broadly comprises providing an injection molding machine having a mold stack including a stationary platen and at least two movable members movable relative to the stationary platen and further having at least two mold assemblies formed by mold halves attached to the stationary platen and the at least two movable members, injecting a molten material into said mold assemblies while said mold assemblies are in a mold closed position to form said molded articles, and moving each of the mold assemblies from the mold closed position to a mold open position where the molded articles are ejected from the machine, which moving step comprises separating the mold halves forming a first mold assembly by a first stroke distance and separating the mold halves forming a second mold assembly by a second stroke distance larger than the first stroke distance.

Other details of the machine, the linkage mechanisms used therein, and the method of the present invention, as well as other advantages and objects attendant thereto, are set forth in the following detailed description and the accompanying drawings, wherein like reference numerals depict like elements.

BRIEF DESCRIPTION OF THE DRAWINGS

FIGS. 2A–2D illustrate a two level stack mold having a second linkage mechanism for opening the mold stations by different stroke lengths;

FIGS. 4A–4H illustrate a two level stack mold having a fourth linkage mechanism for opening the mold stations by different stroke lengths;

DETAILED DESCRIPTION OF THE PREFERRED EMBODIMENT(S)

Figure 1A:
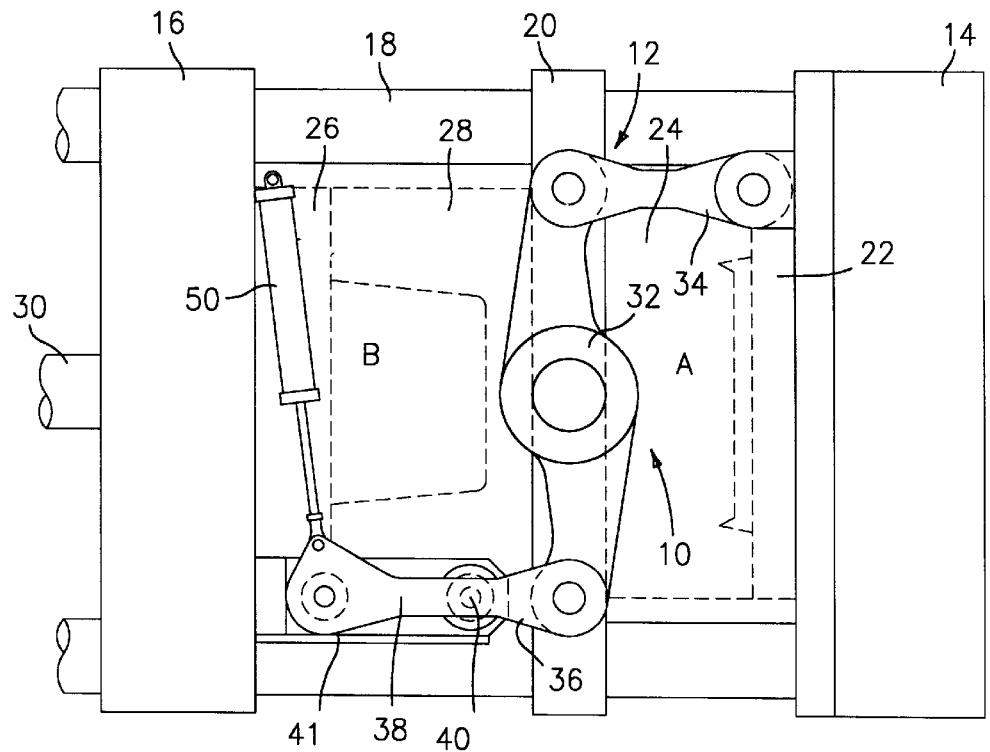
FIGS. 1A–1C illustrate a two level stack mold having a first linkage mechanism for opening the mold stations by different stroke lengths.
Figure 1B:
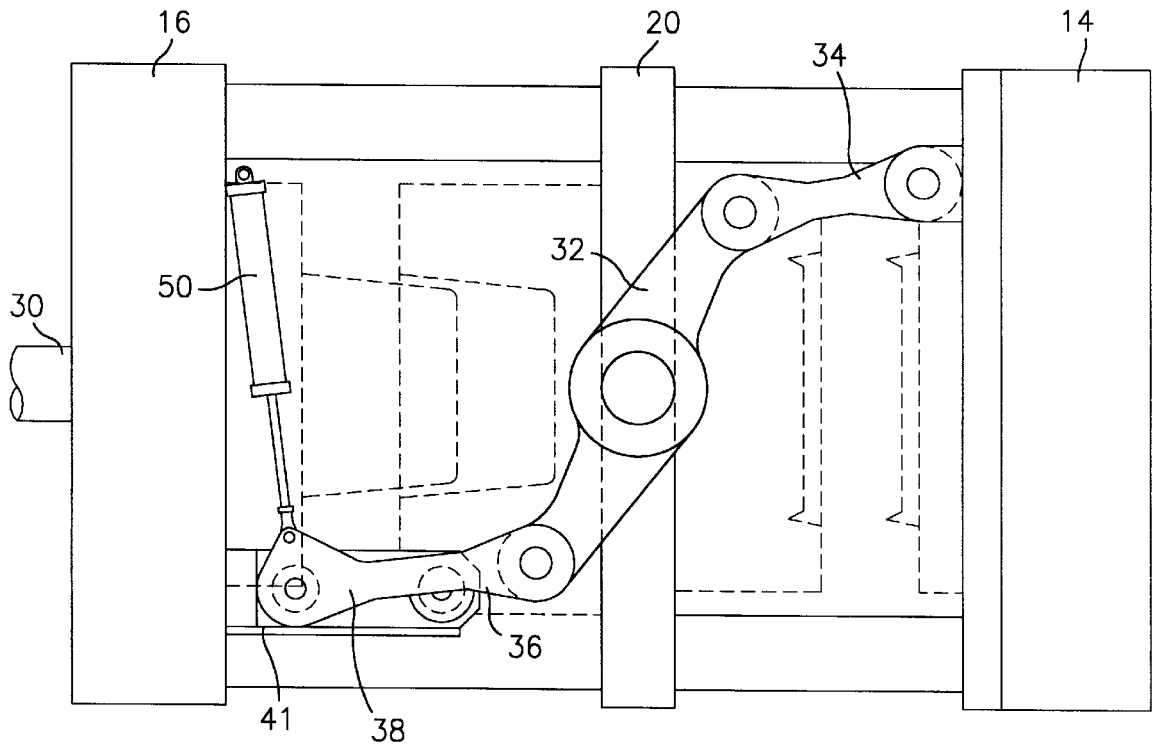
Figure 1C:
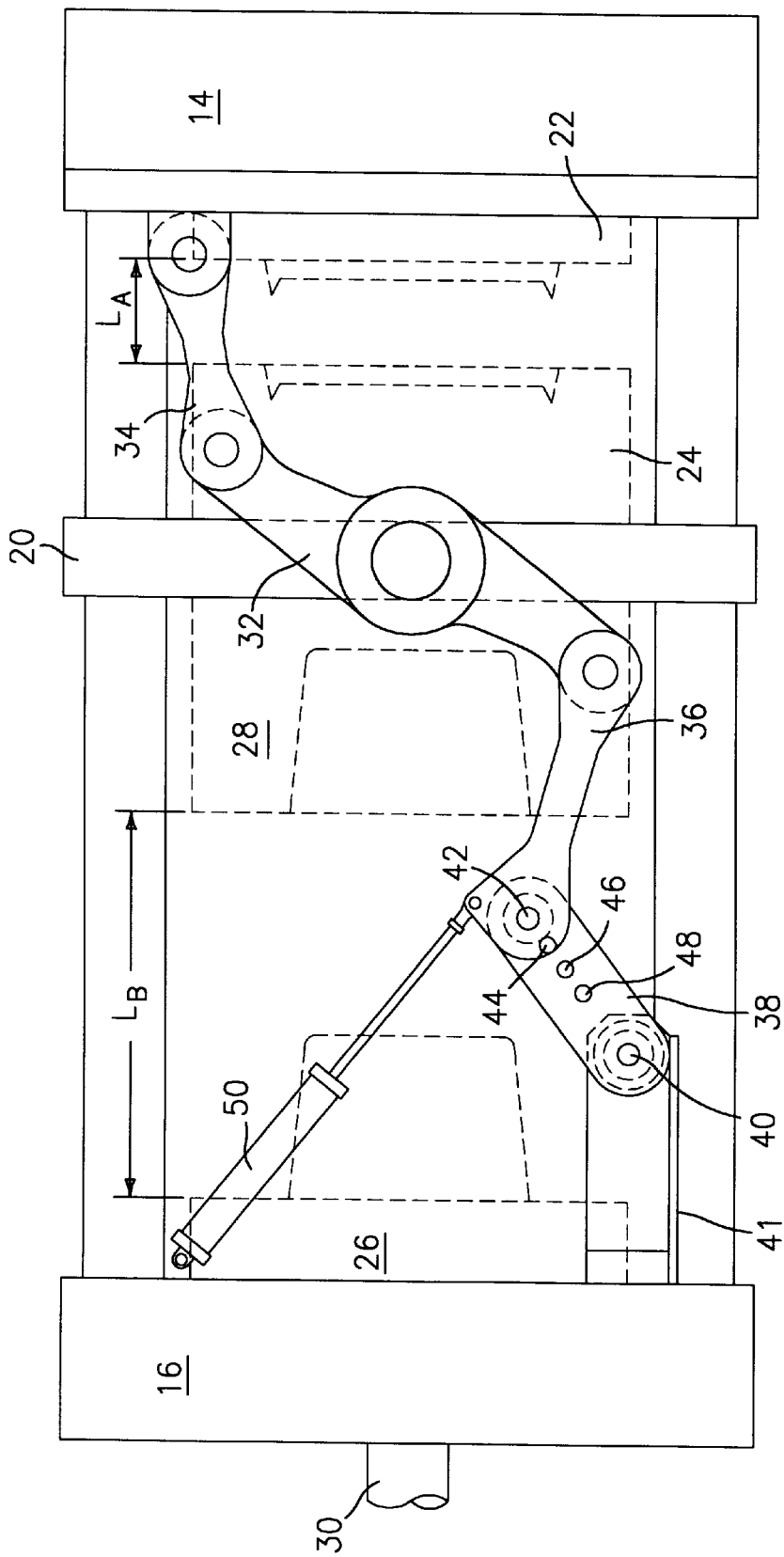

Referring now to the drawings, FIGS. 1A–1C illustrate a portion of an injection molding machine having a two level stack mold arrangement 10 for molding different sized parts having a linkage mechanism 12 for allowing the mold stations A and B to be opened by unequal distances or strokes. The two level stack mold 10 is shown mounted in a clamp and comprises a stationary or fixed platen 14, a moving platen 16, four tiebars 18, and a movable center section carrier 20. The tiebars 18 extend between the stationary platen 14 and a clamp block (not shown). The moving platen 16 and the movable center section carrier 20 are slidable along the tiebars 18. Alternatively, the moving platen 16 and the movable center section carrier 20 could be slidable on a clamp base (not shown) with the tiebars 18 passing through or around them.

The stack mold has two mold sections A and B. Mold section A is formed by a mold core plate or mold half 22 and a mold cavity plate or mold half 24. The mold core plate 22 is mounted to the stationary platen 14, while the mold cavity plate 24 is mounted to one side of the center section carrier 20. Plate 22 and plate 24 may be mounted to the platen 14 and the carrier 20 using any suitable means known in the art. When closed together (a mold closed position), the two plates 22 and 24 define a first mold cavity space into which a material to be molded is injected. Similarly, stack mold section B is formed by a mold core plate or mold half 26 and a mold cavity plate or mold half 28. The mold core plate 26 is mounted to one side of the moving platen 16, while the mold cavity plate 28 is mounted to one side of the center section carrier 20. As before, plate 26 and plate 28 may be mounted to the platen 16 and the carrier 20 using any suitable means known in the art. When closed together (the mold closed position), the plates 26 and 28 define a second mold cavity space into which a material to be molded is injected. The mechanism for injecting the material to be molded into the first and second mold cavity spaces does not form part of the present invention and therefore has not been shown. Any suitable molten material injection system known in the art may be used to inject molten material, such as molten plastic material, into the cavity spaces.

The mold sections A and B move between the mold closed positions shown in FIG. 1A and the mold open positions shown in FIG. 1C as a result of the movable platen 16 being moved away from the stationary platen 14. This may be accomplished by applying an opening force to the platen 16 via a column 30. Any suitable actuation means known in the art, such as a piston-cylinder arrangement (not shown), may be used to move the platen 16 relative to the platen 14. The actuation means (not shown) is also used to move the mold sections A and B from the open position to the closed position.

In the machine shown in FIGS. 1A–1C, the mold station A is forming a lid and the mold station B is forming a bucket. The opening stroke $L_A$ of mold station A required to eject or release the lid can be much less than the opening stroke $L_B$ of mold station B required to release or eject the bucket. As used herein, the term "opening stroke" refers to the distance between the mold plates when a particular mold section is in an open position.

In this embodiment, the stack mold 10 is provided with a linkage mechanism 12 to cause the mold stations A and B to have different or unequal opening strokes $L_A$ and $L_B$ respectively. The linkage mechanism 12 includes a central link member 32 pivotably connected to the center section carrier 20 and a link arm 34 which is connected at one end to the central link member 32 and at the second end to the stationary platen 14. The link arm 34 is preferably connected to the central link member 32 by a pin so that the angular relationship between these two structures can be changed.

The linkage mechanism 12 further includes a second link arm 36 and a third link 38, which pivots about a boss 40 fastened to the moving platen 16 by a member 41. The link arm 36 is mounted to pivot point 42 on the link 38 which can be moved to one of several available positions 44, 46, and 48, each offering a different radius of motion, and thereby a different distance for the motion of the end of the link arm 36. A cylinder 50 is mounted to the moving platen 16, which cylinder moves or actuates the link arm 36.

In operation, as the moving platen 16 opens the mold (see FIG. 1B), the linkage mechanism 12 causes both molds to begin opening. When the moving platen 16 reaches a preselected position, the cylinder 50 is actuated by a programmed controller (not shown) to cause the link arm 38 to rotate through a preselected arc, thereby altering the end position of the link arm 36. This, in turn, causes mold section B attached to the moving platen 16 to continue opening further than mold section A attached to the stationary platen 14. Mold section B opens at a different speed than mold section A because of the additional motion of the link 38. The procedure is reversed to cause the molds to close.

The structure of the programmed controller does not form part of the present invention and therefore has not been described in detail. In fact, any conventional programmable controller known in the art may be used to actuate cylinder 50. Both the timing of the actuation and the speed of motion of cylinder 50 can be programmed to occur at any time during the open stroke of the moving platen 16, thereby causing the two mold sections A and B to open differing or unequal distances at differing speeds as required.

Any suitable ejection means (not shown) known in the art may be provided to eject or remove the molded articles from the mold stations A and B when the mold stations reach the position shown in FIG. 1C.

Figure 2D:
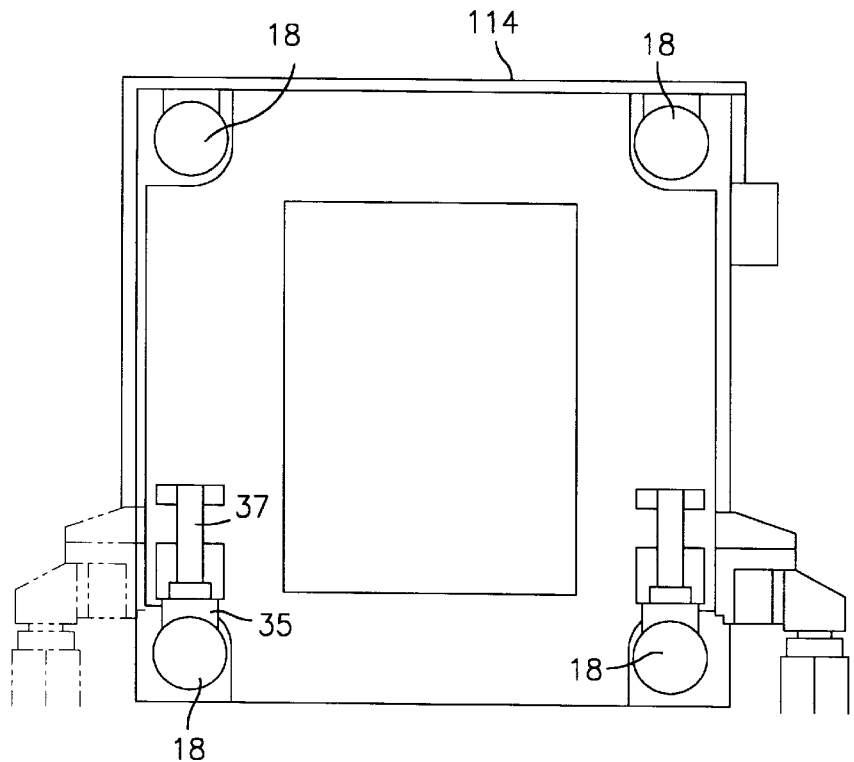
Figure 2A:
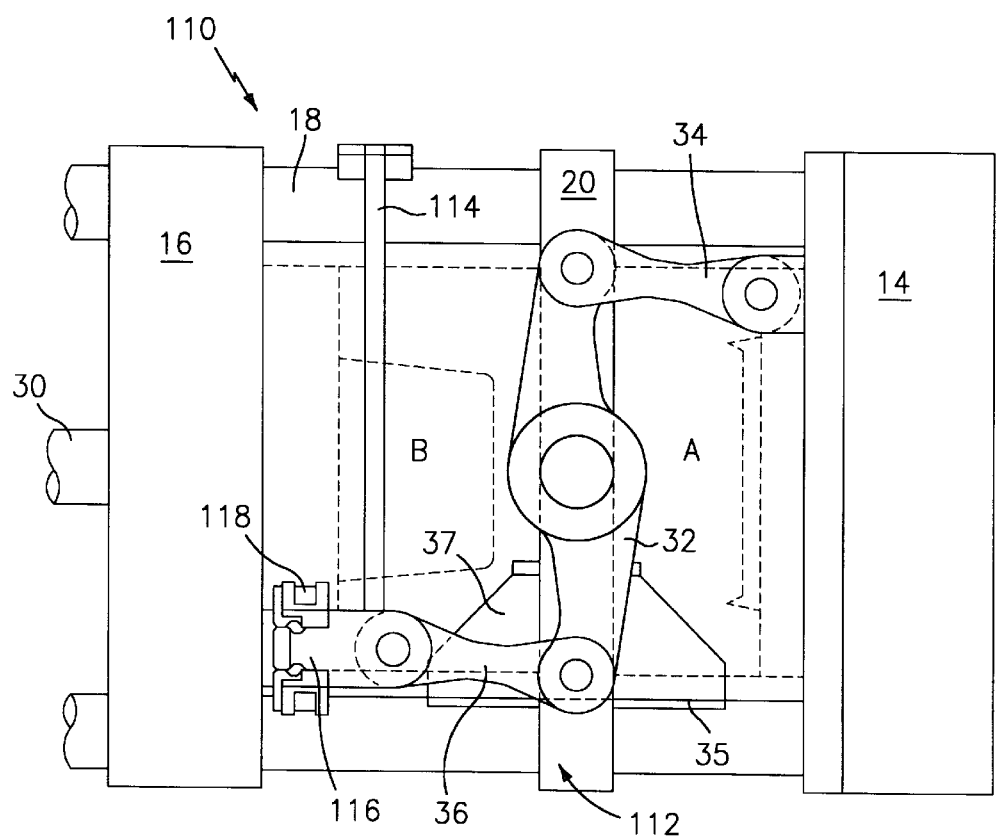
Figure 2C:
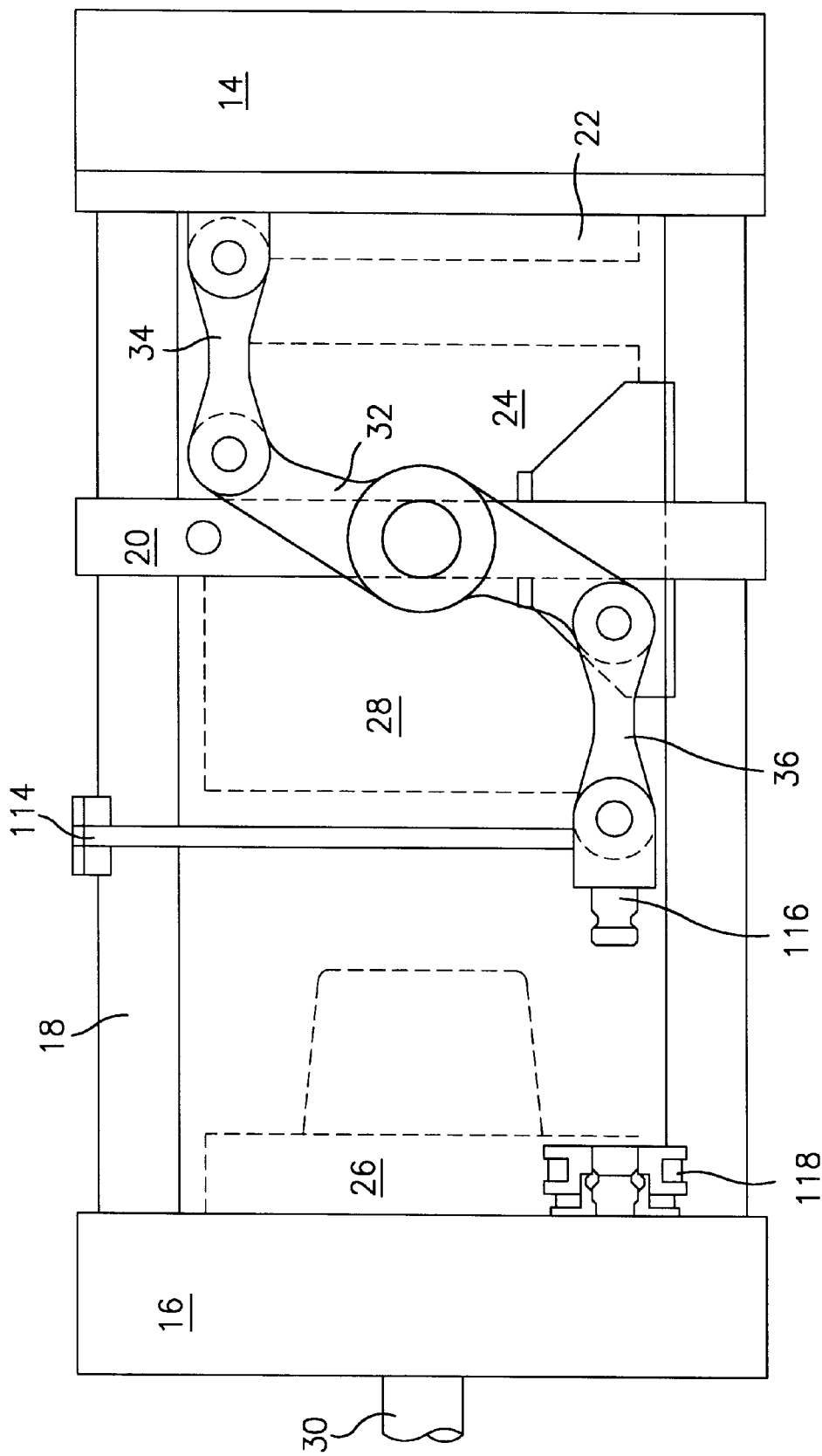

FIGS. 2A–2D illustrate another embodiment of a linkage mechanism 112 for causing the mold stations A and B of a two level stack mold 110 to open with different or unequal stroke lengths. The basic components of the stack mold 110 are the same as in FIGS. 1A–1C. For example, a column 30 is provided to move the moving platen 16 relative to the stationary platen 14 and thereby open and close the mold stations A and B. Further, the linkage mechanism 112 includes a central link member pivotably connected to the central section carrier 20 and a link arm 34 which is connected to the stationary platen 14 at one end and to the central link member 32 at its opposite end. As shown in FIG. 2A, shoes 35 are mounted to both sides of the carrier 20 by brackets 37. The shoes 35 facilitate sliding along the lower tiebars and prevent tipping and rocking. The brackets 37 may be attached to the carrier 16 by any suitable means known in the art such as bolts or screws. A similar shoe arrangement may be provided on platen 16 if desired. In this alternative embodiment however, a frame 114 is supported by, and slides on, the tiebars 18. The frame 114 carries the end of the link arm 36 in a bracket 116. The bracket 116 is selectively gripped or released by a clamp 118 mounted on the moving platen 16.

In operation, the mold is operated so that movement of the platen 16 in a direction away from the platen 14 causes the mold stations A and B to open, initially by an identical stroke (See FIG. 2B). The controller (not shown) is programmed however so that when the moving platen 16 reaches a preselected position as it moves from the mold closed to the mold open position, the bracket 116 is released from the clamp 118, thus freeing the link arm 36 and allowing the mold section B to continue opening further while mold section A stops opening. When the moving platen 16 reaches a preselected position as it moves from the mold open position to the mold closed position, the bracket 116 is automatically reengaged by the clamp 118 so that the link arm 36 operates normally during the closing stroke.

The clamp 118 may comprise any suitable clamping means known in the art. For example, the clamp 118 may have fluid actuated surfaces which grip the bracket 116.

A third embodiment of a linkage mechanism 212 for allowing the mold stations A and B of a two level stack mold 210 to be opened with unequal stroke lengths is shown in FIGS. 3A–3D. The basic components of the stack mold 210 are identical to those shown in FIGS. 1A–1C. For example, a column 30 is provided to move the platen 16 relative to the stationary platen 14 from the mold closed position shown in FIG. 3A, through the mold open position in FIG. 3B, to the final mold open position in FIG. 3C where the mold stations A and B have been opened by unequal stroke lengths. The linkage mechanism 212 includes a central link member 32 pivotably connected to the central section carrier 20 by a central pinion 33 and a link arm 34 connected at one end to the stationary platen 14 and at the other end to an end of the central link member 32 by a conventional pivot bearing. In this embodiment however, the linkage mechanism 212 is different in that it includes a slide bar 214 slidably mounted to the moving platen 16 and pivotally attached to the link arm 36 by a conventional pivot bearing. The slide bar 214 may be slidably mounted to the moving platen using any suitable means known in the art and is preferably restrained to slide only in a horizontal motion.

Figure 3A:
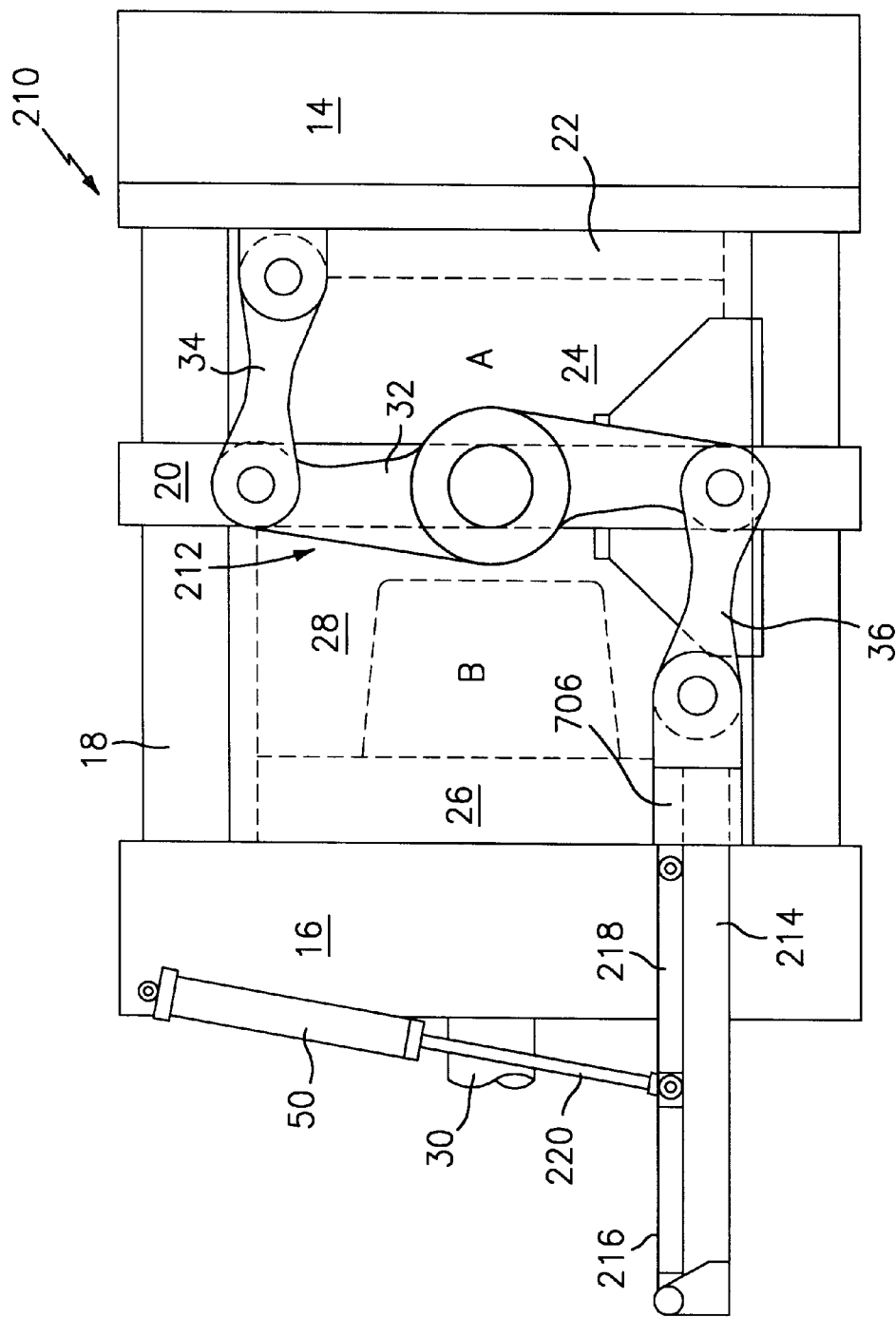
FIGS. 3A–3D illustrate a two level stack mold having a third linkage mechanism for opening the mold stations by different stroke lengths.
Figure 3B:
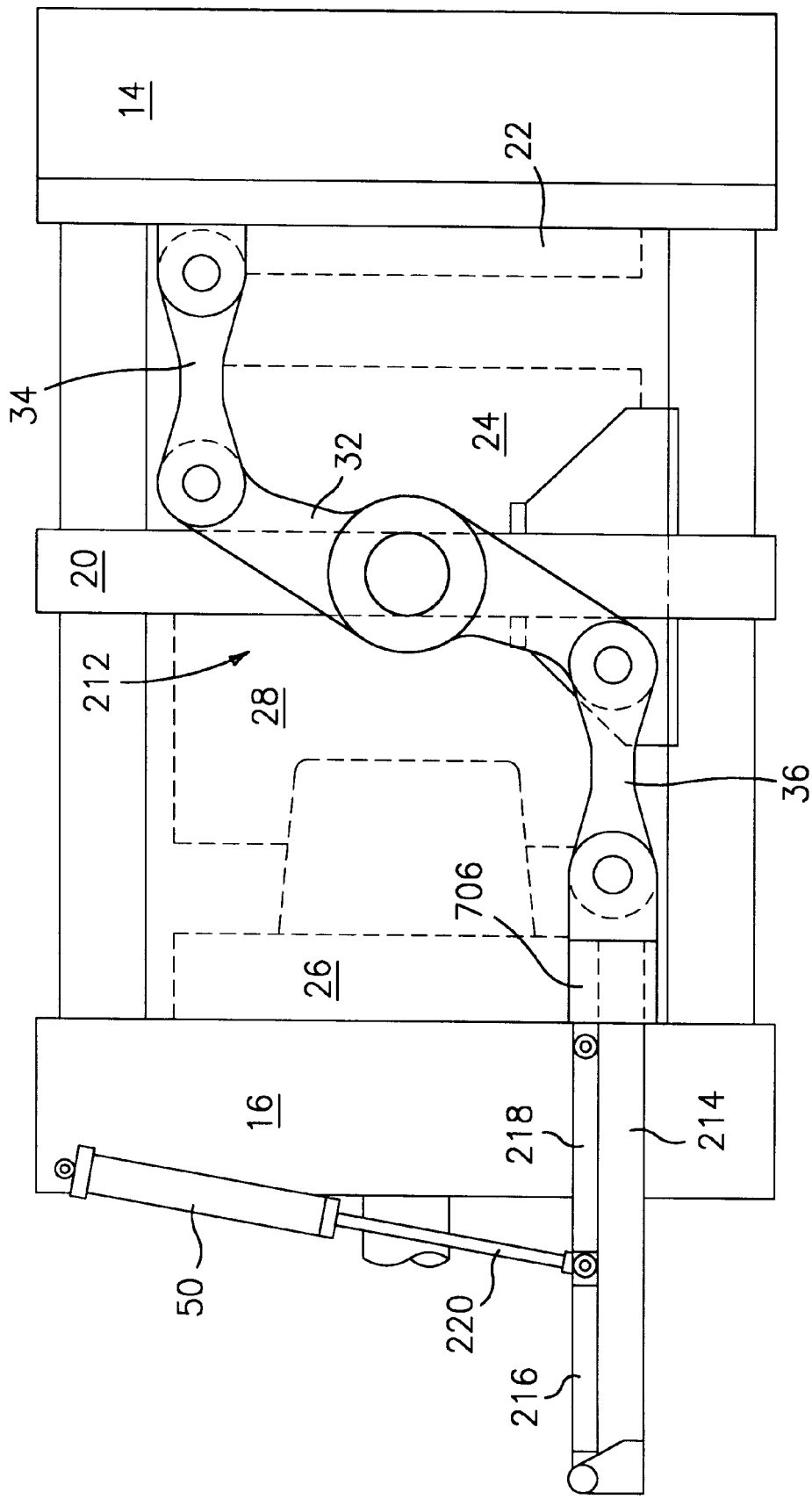
Figure 3C:
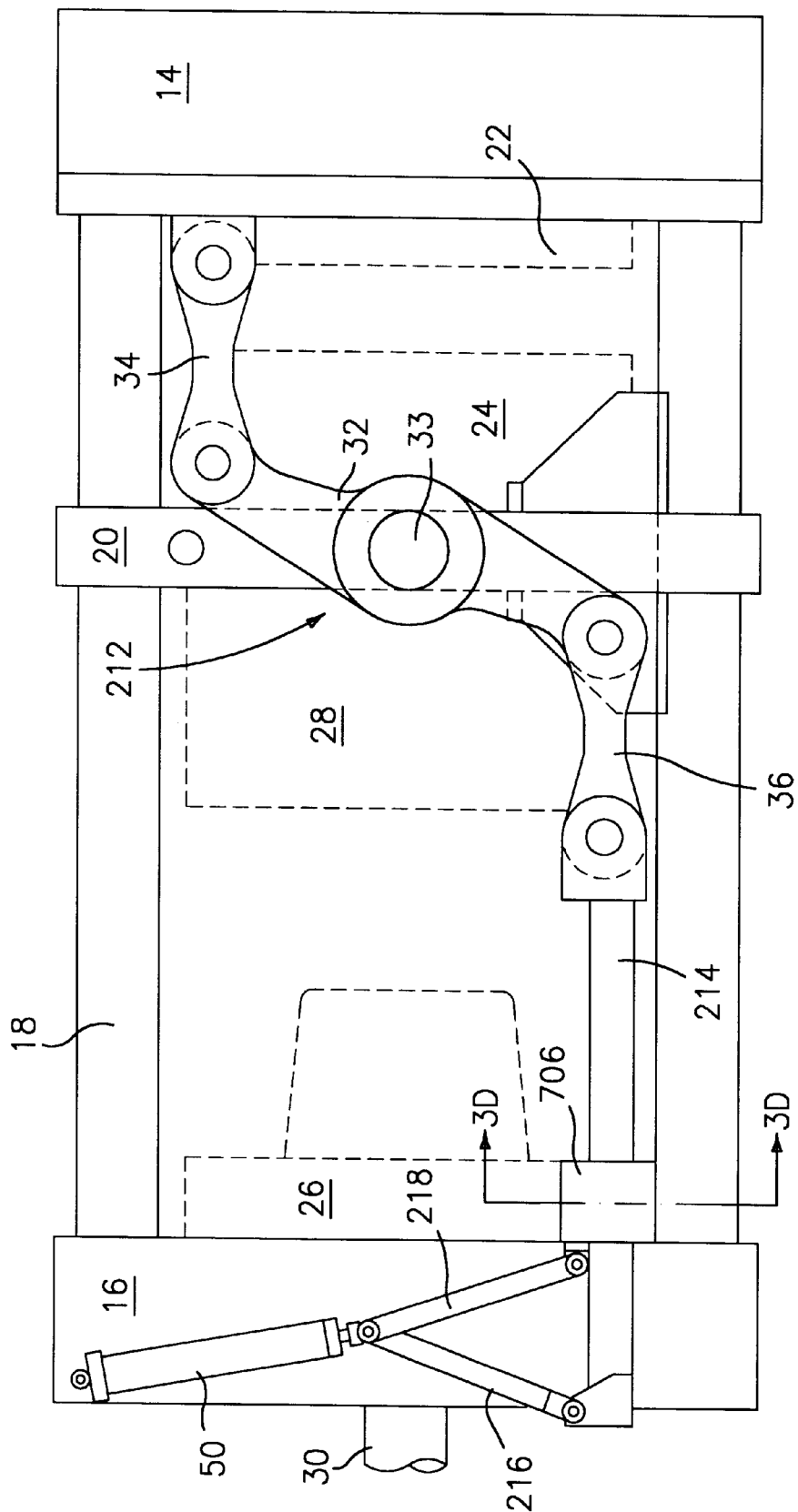
Figure 3D:
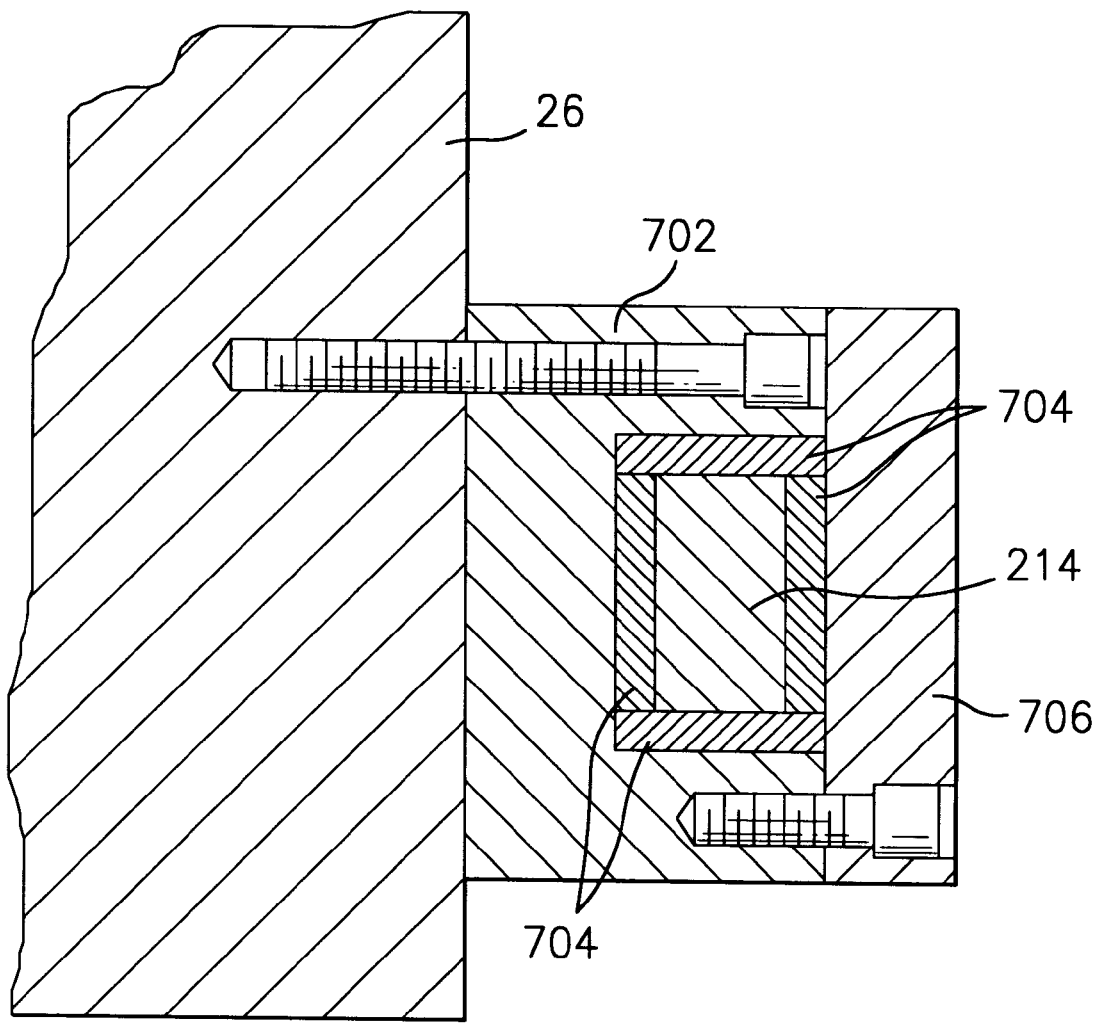
Figure 4A:
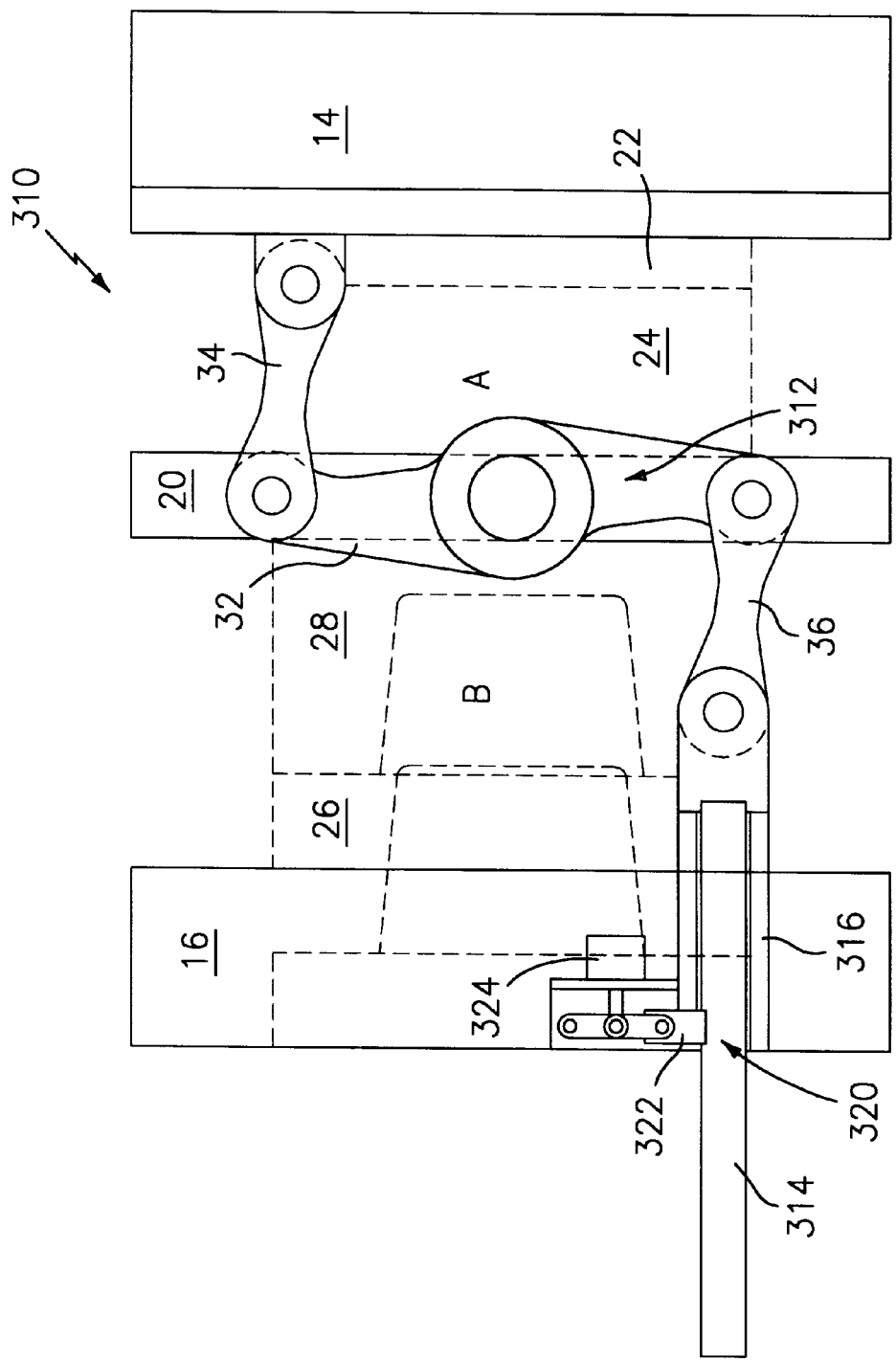
Figure 4B:
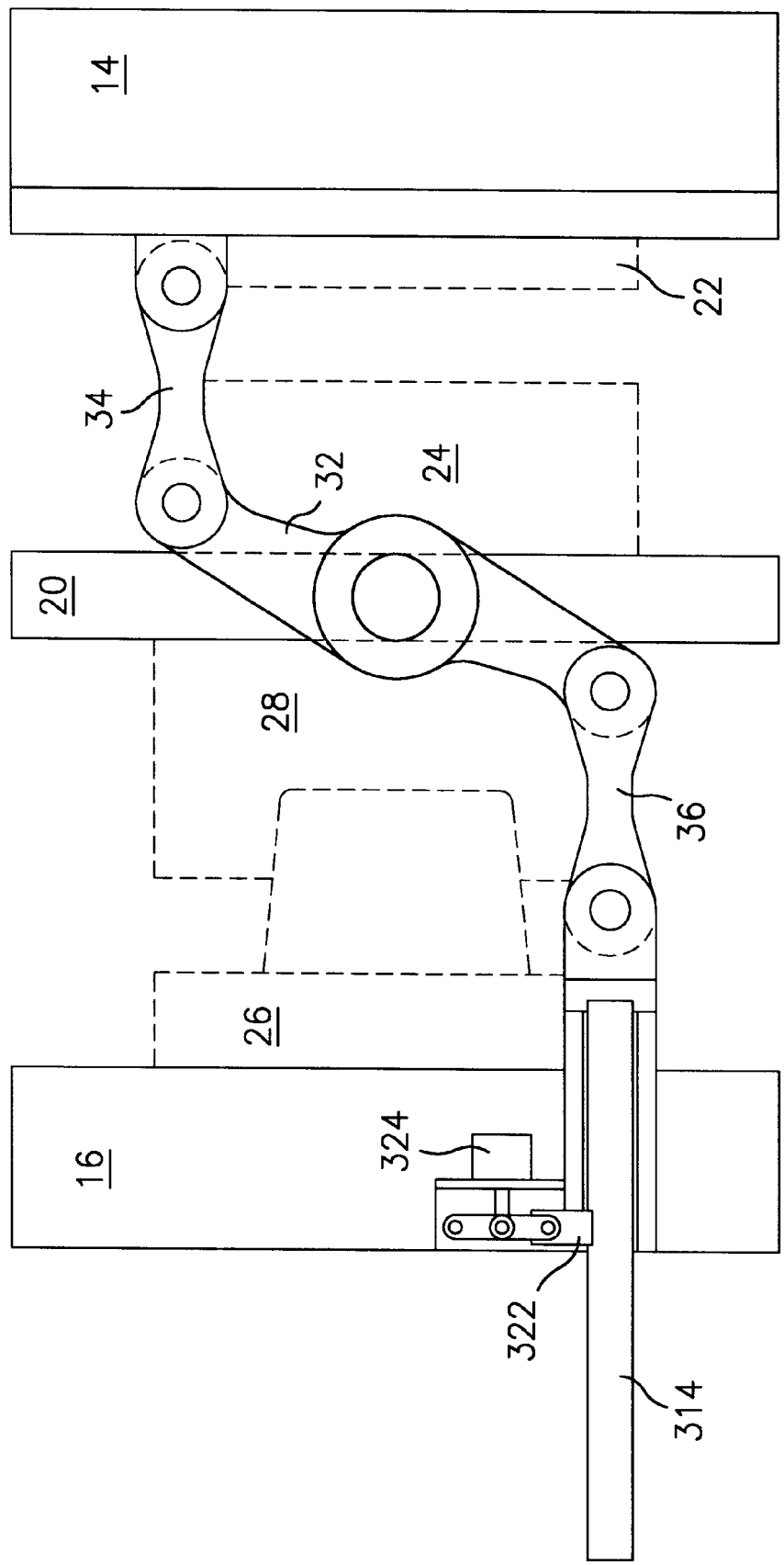
Figure 4C:
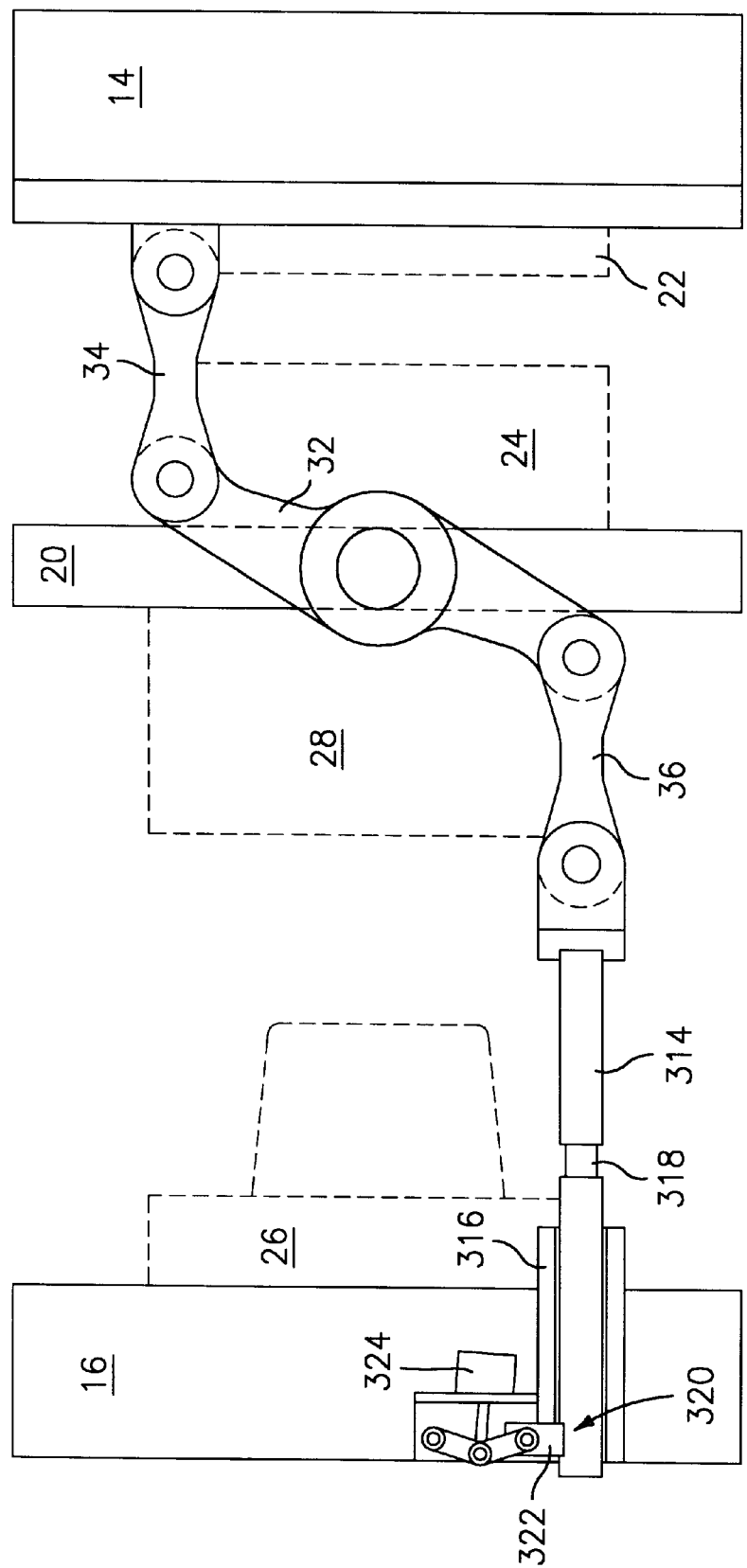

As shown in FIG. 3D, a block 702 is bolted to either the mold platen 26 or the machine platen 16. The block contains a plurality of bearing pads 704 which allow the slide bar 214 to move freely horizontally through the block 702. The bearing pads 704 may comprise bronze wear plates. A cover 706 is provided to protect the slide bar 214 and the bearing pads 704.

A cylinder 50, controlled by a programmable controller (not shown), is connected to the slide bar 214 by two links 216 and 218. Actuation of the cylinder 50 extends and retracts the slide bar relative to the moving platen 16. In operation, the cylinder 50 is actuated during the opening stroke when the moving platen 16 reaches a preselected position such as that shown in FIG. 3B. The cylinder 50 then retracts the arm 220 causing the slide bar 214 to extend and thereby increase the opening stroke of mold station B without increasing the opening stroke of the mold station A. When the moving platen 16 is moved by the column 30 to the mold closed position, the cylinder 50 is again actuated when the platen 16 reaches a preselected position. The actuated cylinder 50 extends the arm 220 causing the links 216 and 218 to retract the slide bar 214.

Referring now to FIGS. 4A–4F, a fourth embodiment of a linkage mechanism 312 for permitting the mold stations of a two level stack mold 310 to open with different stroke lengths is illustrated. Here again, the basic components of the two stack mold 310 are identical to those shown in FIGS. 1A–1C. The mold 310 includes a stationary platen 14, a central section carrier 20 and a moving platen 16 which is caused to be moved by column 30 from a mold closed position (See FIG. 4A) to a position where the mold stations A and B are opened by the same distance (FIG. 4B) to a final mold open position (FIG. 4C) where the mold stations A and B have been opened by different or unequal stroke lengths. The linkage mechanism 312 includes a central link member 32 pivotably connected to the central section carrier 20, a link arm 34 connected at one end to the stationary platen 14 and at the other end to the central link member 32, and a link arm 36 connected to the opposite end of central link member 32. In this embodiment, the link arm 36 is connected to one end of a bar 314. The bar 314 slides through a bracket 316 mounted to the moving platen 16. The bar 314 has a recess 318 which is engaged by a locking unit 320. The locking unit 320 includes a block 322 which engages the recess 318 and an actuator 324 to move the block 322 between an engaged position (See FIG. 4A) and a disengaged position (See FIG. 4C).

As shown in FIGS. 4D–4H, a cylinder 50 is mounted to the moving platen 16. As before, the cylinder is actuated by a programmable controller (not shown). The cylinder 50 may be connected to the bar 314 by any one of the linkages 326, 326' or 326". As shown in FIGS. 4D and 4G, the linkage 326 comprises two pivotally connected link arms 328 and 330 mounted within an end portion of the bar 314. The link arms 328 and 330 are connected to the cylinder 50 via the arm 332. As shown in FIGS. 4E and 4H, the linkage 326' includes two pairs of links 334 and 336 attached to opposite sides of the bar 314. Each pair of links 334 and 336 is connected by a bracket 338 and an arm 340 to the cylinder 50. As shown in FIG. 4F, the linkage 326" comprises two links 342 and 344 mounted to an upper surface of the bar 314. The links 342 and 344 are connected to the cylinder 50 by a bracket 346 and the arm 348.

The machine may be programmed so that during the opening stroke, when the moving platen 16 reaches a preselected position, the actuator 324 is actuated to move the block 322 from a recess engaging position to a recess disengaged position. Further, the cylinder 50 is actuated to move the bar 314 via linkage 326, 326' or 326" so as to extend the opening stroke of the mold station B. During the closing stroke, when the moving platen 16 reaches a preselected position, the cylinder 50 is actuated to retract the bar 314 and the actuator 324 is actuated to cause the block 322 to engage the recess 318.

Figure 5A:
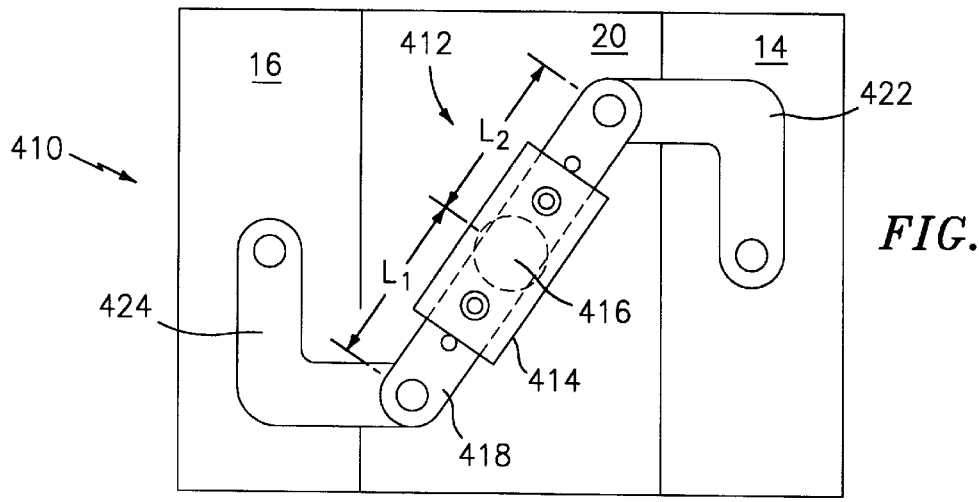
FIGS. 5A–5D illustrate a two level stack mold having a fifth linkage mechanism for opening the mold stations by different stroke lengths.
Figure 5B:
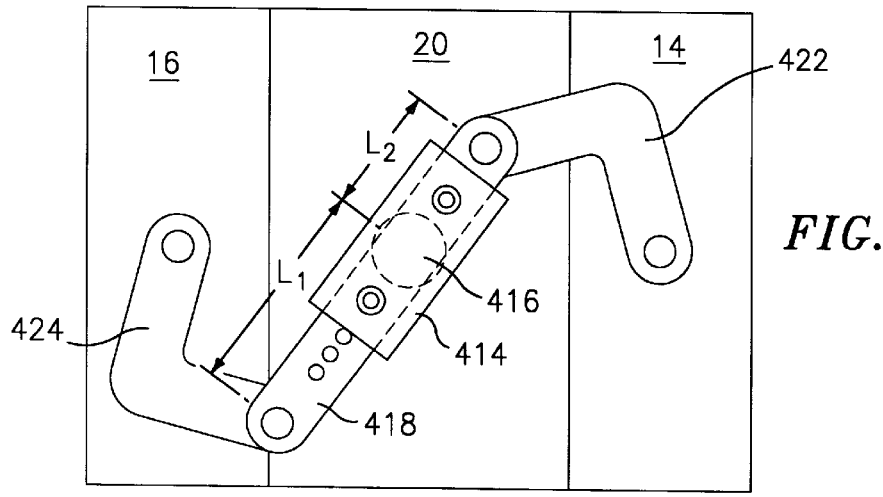
Figure 5C:
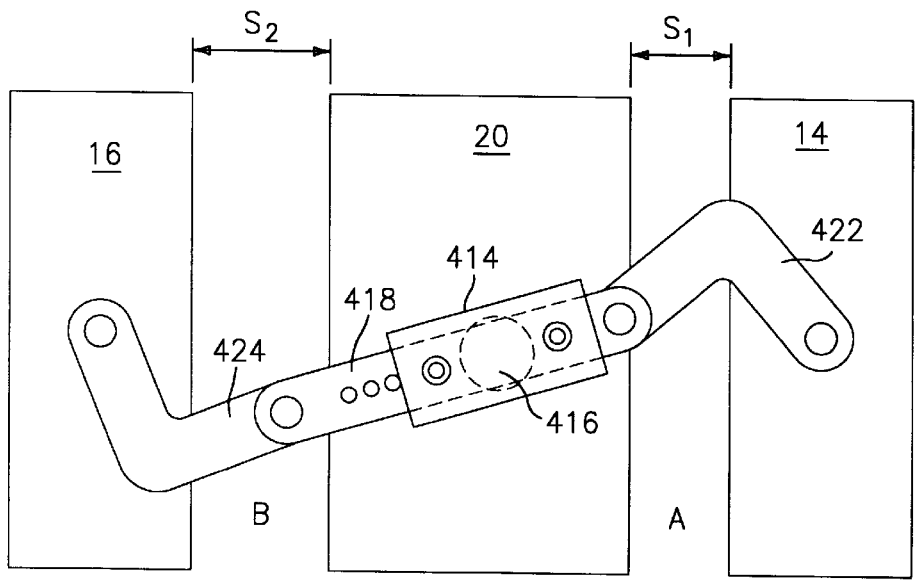
Figure 5D:
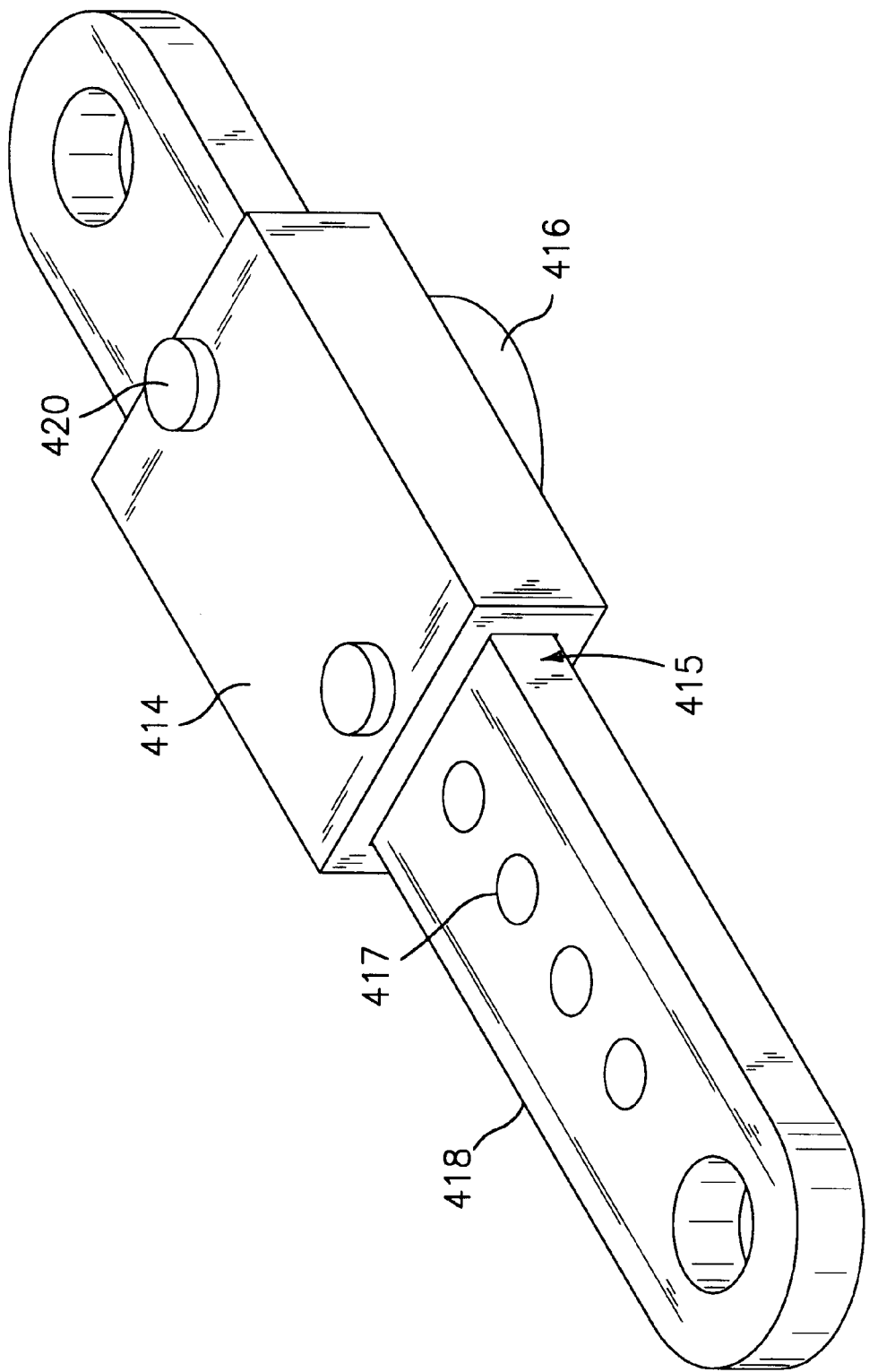

FIGS. 5A–5D shows a fifth embodiment of a linkage mechanism 412 for causing the mold stations A and B of a two level stack mold 410 to open with different or unequal stroke lengths. As in the other embodiments, the basic components of the two level stack mold 410 are identical to those shown in FIGS. 1A–1C. Further, the moving platen 16 is moved between a mold closed position and a mold open position and vice versa as previously discussed. The linkage mechanism 412 is different from the linkage mechanisms shown in the previous embodiments. The linkage mechanism 412 is formed by channel 414 mounted on a center pivot 416 attached to the central mold section or carrier 20. As can be seen in FIG. 5D, the channel 414 has a central passageway 415.

The linkage mechanism 412 further includes a center arm 418 mounted inside the channel 414. The center arm 418 is connected to link arms 422 and 424 which are in turn respectively connected to the stationary platen 14 and the moving platen 16. The center arm 418 has a plurality of through slots 417 and can be adjustably slid through the passageway 415 such that the distance between its ends and the center, $L_1$ and $L_2$, can be altered such that they are unequal. Once adjusted, the center arm 418 can be locked in position with respect to the channel 414 by using suitable through bolts 420 which pass through two slots 417 in arm 418.

This configuration of a linkage mechanism provides the means to cause the mold sections A and B to travel different opening strokes $S_1$ and $S_2$ such that the mold station A has a different opening stroke from mold station B.

Figure 6A:
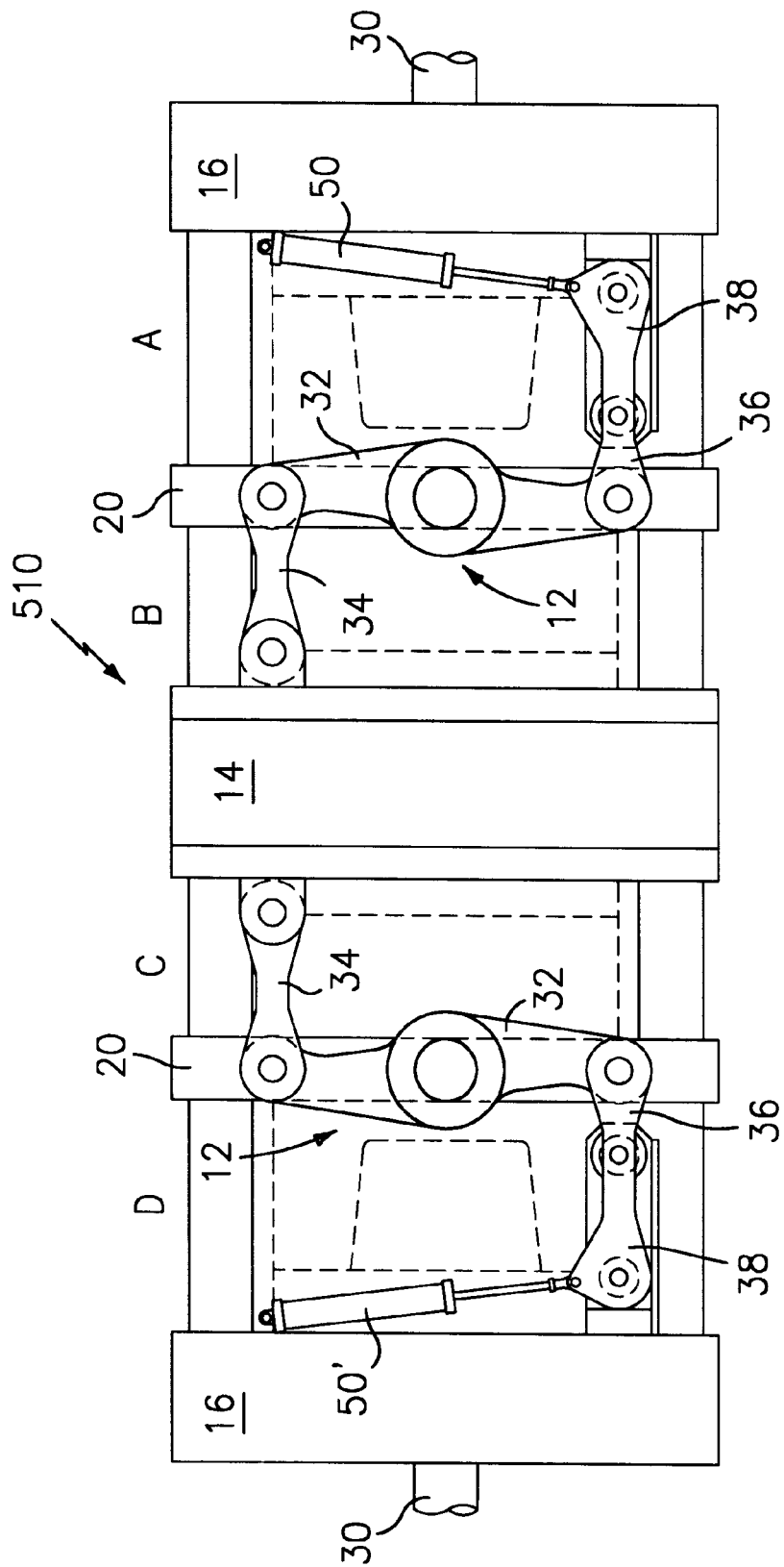
FIGS. 6A and 6B illustrate a linkage mechanism for opening the mold stations of a four level stack mold by unequal stroke lengths.
Figure 6B:
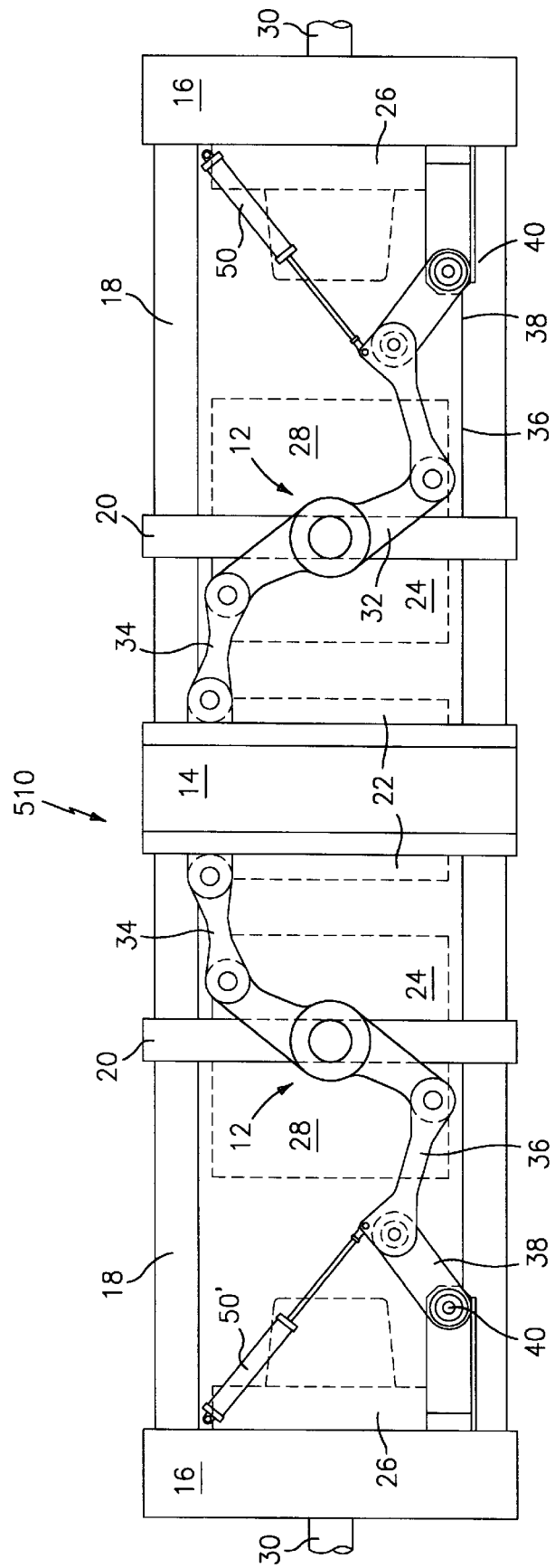

FIGS. 6A and 6B show a four level stack mold 510 using the linkage mechanism 12 shown in FIGS. 1A–1C. The mold 510 includes a stationary platen 14, two central section carriers 20 and two moving platens 16. The mold 510 also includes columns 30 attached to the moving platens 16 for moving the mold stations A, B, C, and D between mold closed (FIG. 6A) and mold open (FIG. 6B) positions. Any suitable mechanism known in the art for moving the platens 16 can be connected to the columns 30.

Four mold stations A, B, C, and D are formed by mold core plates and mold cavity plates mounted to the platens 14 and 16 and the central section carriers 20. The four mold stations can be opened simultaneously using the linkage mechanism 12 with stations A and D being opened differing amounts from mold stations B and C and from each other since cylinders 50 and 50' can be programmed to operate with different strokes.

Figure 7A:
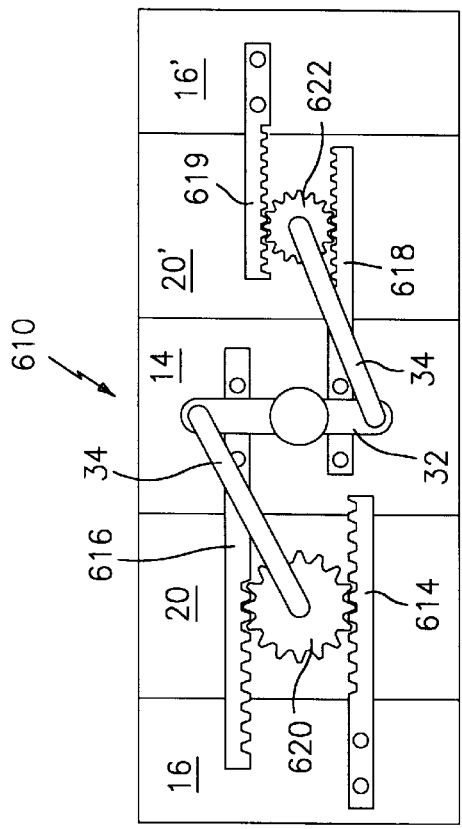
FIGS. 7A and 7B illustrate an alternative linkage mechanism for opening the mold stations of a four level stack mold by different stroke lengths.
Figure 7B:
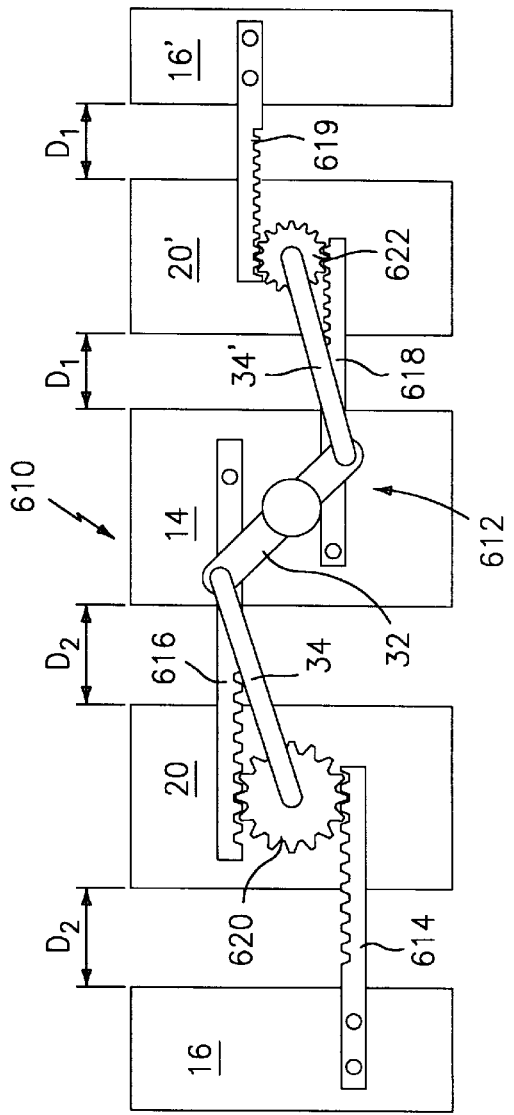

FIGS. 7A and 7B illustrate yet another linkage mechanism 612 for opening the mold stations of a four level stack mold 610 by different or unequal stroke lengths. The basic components of the four level stack mold 610 are identical to the components described in connection with the embodiment of FIGS. 6A and 6B. Similarly, the method for causing the moving platens 16 to move from a mold closed position (FIG. 7A) to a mold open position (FIG. 7B) and vice versa is the same as that previously discussed.

The linkage mechanism 612 includes racks 614, 616, 618 and 619 mounted to the platens 16, 14 and 16' respectively. The linkage mechanism 612 also includes gears 620 and 622 mounted to central section carriers 20 and 20' respectively, a central link member 32 pivotally mounted to the stationary platen 14, and link arms 34 and 34'. The link arms 34 and 34' are each connected at one end to the central link member 32 and at a second end to one of the gears 620 and 622. The link arm 34 preferably has a longer length than the link arm 34'. The gears 620 and 622 preferably have different diameters such that when they engage their respective racks, they cause the mold sections on which the racks are mounted to move different distances $D_1$ and $D_2$ as shown in FIG. 7B.

While the present invention has been described with reference to a number of linkage mechanism examples mounted directly to the mold sections, it should be apparent that the linkage mechanisms can equally be mounted on carriers that remain part of the molding machine after the mold sections have been removed or changed.

Further, it should be recognized that the linkage mechanisms disclosed herein are designed to be adjustable in that the various different strokes they cause can be altered for different mold section installations by either simple control changes or by changing out a few components in the mechanism, such as the different gear diameters of the embodiment of FIGS. 7A and 7B. Thus, the linkage mechanisms taught herein are universal in their application to stack molds having two or mold sections.

While the invention has been described in the context of a single article being molded at each mold station, it should be apparent that multiple articles could be molded at each station.

It is apparent that there has been provided in accordance with the present invention stack mold linkages with unequal strokes which fully satisfy the means, objects and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding machine comprising:
   a stationary platen and at least two members movable relative to said stationary platen;
   at least two mold assemblies formed by mold halves attached to said stationary platen and said two movable members;
   means for moving each of said at least two mold assemblies between a mold closed position and a mold open position; and
   said moving means including means for separating the mold halves forming said mold assemblies by unequal stroke distances.

2. Machine according to claim 1, wherein said separating means comprises first means for separating the mold halves of a first one of said mold assemblies by a first stroke distance and second means for separating the mold halves of a second one of said mold assemblies by a second stroke distance, which second stroke distance is greater than said first stroke distance.

3. Machine according to claim 2 further comprising means for actuating said second means when one of said movable members reaches a preselected position.

4. Machine according to claim 2, wherein:
   said two movable members include a central section carrier and a movable platen;
   said first means comprising a linkage assembly pivotally connected to said central section carrier; and
   said second means comprising a rotatable link arm mounted to said movable platen and connected to said linkage assembly.

5. Machine according to claim 4, further comprising means for causing said rotatable link arm to rotate when said movable platen has reached a preselected position.

6. Machine according to claim 5, wherein said means for causing said rotatable link arm to rotate comprises an actuation cylinder mounted to said movable platen.

7. Machine according to claim 4, wherein:
said linkage assembly comprises a central link pivotably connected to said central section carrier and a first link arm connected to a first end of said central link and to said stationary platen; and
said second means further comprises a second link arm connected to a second end of said central link and to said rotatable link arm.

8. Machine according to claim 7, wherein said second link arm is pivotally connected to said rotatable link arm so that said second link arm and the rotatable link arm can change their angular relationship to each other.

9. Machine according to claim 8, further comprising:
said rotatable link arm having a plurality of spaced slots for changing the distance said movable platen can travel; and
said second arm being connected to said rotatable link arm by a pin which passes through one of said slots.

10. Machine according to claim 2, further comprising:
a plurality of tiebars;
said movable members comprising a central section carrier and a movable platen;
said first means comprising a linkage assembly connected to said central section carrier; and
said second means comprising a bracket member connected to said linkage assembly and means for releasably clamping said bracket member to said movable platen.

11. Machine according to claim 10, wherein said releasable clamping means is operated to release said bracket member when said movable platen reaches a preselected position.

12. Machine according to claim 10, further comprising:
said linkage assembly including a central link connected to said central carrier and a first link arm connected to a first end of said central link and to said stationary platen;
said second means further comprising a second link arm connected to a second end of said central link and to said bracket member; and
a movable frame attached to said second link arm for carrying an end thereof.

13. Machine according to claim 2, wherein:
said movable members comprise a movable platen and a central section carrier;
said first means comprises a linkage assembly connected to said central section carrier; and
said second means comprises a bar attached to said linkage assembly, said bar being slidably mounted to said movable platen.

14. Machine according to claim 13, wherein said second means further comprises an actuation unit and first and second links each connected to said actuation unit and to said bar and wherein said actuation means causes relative movement between said bar and said movable platen when said movable platen reaches a preselected position.

15. Machine according to claim 13, wherein said linkage assembly comprises a central link connected to said central carrier and a first link arm connected to said stationary platen and to a first end of said central link, and said second means further comprises a second link arm connected to a second end of said central link and to an end of said bar.

16. Machine according to claim 2, wherein:
said movable members comprises a central section carrier and a movable platen;
said first means comprises a linkage assembly connected to said central section carrier; and
said second means comprising a bar connected to said linkage assembly, said bar and said movable platen being movable relative to each other.

17. Machine according to claim 16, further comprising:
said bar having a recess; and
said movable platen having a locking means for securing said bar in a fixed position relative to said movable platen by engagement with said recess.

18. Machine according to claim 17, wherein said locking means disengages from said recess when said movable platen reaches a preselected position, thereby allowing relative movement between said movable platen and said bar.

19. Machine according to claim 18, further comprising:
means for causing relative movement between said bar and said movable platen when said movable platen reaches a preselected position.

20. Machine according to claim 19, wherein said relative movement causing means comprises an actuation unit connected to said movable platen and at least one link connected to said bar and said actuation unit.

21. Machine according to claim 19, wherein said relative movement causing means comprises an actuation unit connected to said movable platen and first and second link arms, each of said link arms being connected to said actuation unit at one end and to said bar at a second end.

22. Machine according to claim 16, wherein said linkage assembly comprises a central link pivotally connected to said central section carrier and a first link arm connected to said stationary platen and to a first end of said central link and said second means further comprises a second link arm connected to a second end of said central link and to an end of said bar.

23. Machine according to claim 1, wherein:
said movable members comprise a central section carrier and a movable platen; and
said separating means comprises a channel member pivotally connected to said central section carrier at a pivot point, a center arm positioned within said channel member and being movable relative to said channel member so that the distance between its ends and said pivot point can be changed, a first link arm attached to one end of said center arm and said stationary platen and a second link arm attached to a second end of said center arm and said movable platen.

24. Machine according to claim 23, wherein said center arm has a plurality of slots for allowing the position of said center arm relative to said channel member to be changed.

25. Machine according to claim 24, further comprising pins for securing said center arm in a desired position relative to said channel member, said pins passing through at least two of said slots.

26. Machine according to claim 2, further comprising:
said machine having four movable members including two central section carriers and two movable platens;
said first means comprising a linkage assembly pivotally connected to each of said central section carriers; and
said second means comprising a rotatable link arm mounted to each of said movable platens and connected to a respective one of said linkage assemblies.

27. Machine according to claim 26, further comprising actuation means for causing each said rotatable link arm to rotate when said movable platen to which it is connected has reached a preselected position.

28. Machine according to claim 27, wherein said actuation means for causing each said rotatable link arm to rotate comprises an actuation cylinder mounted to each said movable platen.

29. Machine according to claim 26, wherein:
   each said linkage assembly comprises a central link pivotably connected to a respective one of said central section carriers and a first link arm connected to a first end of said central link and to said stationary platen; and
   said second means further comprises a second link arm connected to a second end of said central link and to said rotatable link arm.

30. Machine according to claim 29, wherein each said second link arm is connected to a respective one of said rotatable link arms so that said second link arm and the rotatable link arm can change their angular relationship relative to each other.

31. Machine according to claim 1, further comprising:
   four movable members including two central section carriers and two movable platens;
   four mold assemblies formed by mold halves attached to said stationary platen, said central section carriers and said movable platens;
   said separating means comprising a plurality of racks attached to said stationary platen and said movable platens, gear means mounted to said central section carriers for engaging said plurality of racks, and a linkage assembly pivotably mounted to said stationary platen;
   said linkage assembly being rotatably mounted to said stationary platen and having a first link arm connected to a first one of said gears and a second link arm connected to a second one of said gears, said second link arm being longer than said first link arm, whereby rotation of said linkage assembly causes two of said mold assemblies to be separated by a first stroke distance and causes the remaining two of said mold assemblies to be separated by a second stroke distance greater than said first stroke distance.

32. Machine according to claim 31, wherein said gear means comprises two gears, and one of said gears having a larger diameter than the other of said gears.

33. Machine according to claim 31, wherein said linkage assembly includes a central link member rotatably mounted to said stationary platen and each of said first and second link arms being connected to a respective end of said central link member.

34. A method for fabricating molded articles using a single molding machine comprising the steps of:
   providing an injection molding machine having a stationary platen and at least two members movable relative to said stationary platen and further having at least two mold assemblies formed by mold halves attached to said stationary platen and said at least two movable members;
   injecting a material into each of said mold assemblies while said assemblies are each in a mold closed position to form said articles;
   moving each of said mold assemblies between said mold closed position and a mold open position where said molded articles are ejected from the machine; and
   said moving step comprising separating the mold halves forming a first mold assembly by a first stroke distance and separating said mold halves forming a second mold assembly by a second stroke distance larger than said first stroke distance.

35. Method according to claim 34, wherein said moving step comprises separating said mold halves forming a first mold assembly at a rate of speed different from the rate of speed used to separate said mold halves forming said second mold assembly.

36. Method according to claim 34, wherein said step of separating said mold halves forming a second mold assembly a second stroke distance comprises actuating means for increasing the stroke distance when one of said at least two movable members reaches a preselected position.

37. Method according to claim 36, wherein said actuating step comprises actuating a rotatable link mounted to said one movable member to increase said stroke distance.

38. Method according to claim 36, further comprising:
   providing a rotatable linkage assembly attached to a first one of said movable members and a bracket member connected to said linkage assembly;
   providing means for clamping said bracket member to a second one of said movable members; and
   said actuating step comprising releasing said bracket member to increase said stroke distance.

39. Method according to claim 36, further comprising:
   providing a rotatable linkage assembly mounted to a first one of said movable members and a slide bar mounted to said linkage assembly; and
   said actuating step comprising moving said slide bar relative to a second one of said movable members so as to increase said stroke distance.

40. Method according to claim 36, further comprising:
   providing a rotatable linkage assembly mounted to a first one of said movable members and a slide bar having a recess mounted to said linkage assembly;
   providing a locking unit mounted to a second one of said movable members for engaging said recess; and
   said actuating step comprising releasing said locking unit from engagement with said recess so that said slide bar can move relative to said second one of said movable members and thereby increase the stroke distance.

41. Method according to claim 34, further comprising:
   mounting a channel member on one of said stationary platen and said movable members;
   providing a center arm member having two link arms attached to its ends;
   attaching said link arms to the others of said stationary platen and said movable members; and
   adjusting said center arm member relative to said channel member so as to separate the mold halves forming the first mold assembly by said first stroke distance and the mold halves forming the second mold assembly by said second stroke distance.

42. Method according to claim 34, wherein said step of providing an injection molding machine comprising providing an injection molding machine having said stationary platen and four movable members and further having four mold assemblies formed by said mold halves attached to said stationary platen and said movable members.

43. Method according to claim 42, further comprising:
   mounting rack means on said stationary platen and on first and second ones of said movable members;
   mounting gear means on third and fourth one of said movable members to engage said rack means;
   mounting a linkage assembly to said stationary platen, said linkage assembly having a first arm of a first length connected to a first one of said gear means and a second arm of a second length connected to a second one of said gear means, said second length being greater than said first length; and said moving step comprising actuating said linkage assembly so as to separate two of said mold assemblies by said first stroke distance and to separate two of said mold assemblies by said second stroke distance.

44. Method according to claim 42, wherein said moving step comprises:

mounting a rotatable arm member to a first one and a second one of said movable members;

connecting each of said rotatable arm members to a rotatable linkage connected to one of a third one and a fourth one of said movable members; and actuating each of said rotatable members when said first and second movable members reach a preselected position to cause two of said mold assemblies to separate by said second stroke distance.

* * * * *